United States Patent [19]

Cockroft

[11] Patent Number: 4,605,883
[45] Date of Patent: Aug. 12, 1986

[54] MOTOR SPEED CONTROL CIRCUIT

[75] Inventor: James B. Cockroft, Wauwautosa, Wis.

[73] Assignee: Sunbeam Corporation, Oak Brook, Ill.

[21] Appl. No.: 345,972

[22] Filed: Feb. 5, 1982

[51] Int. Cl.$^4$ ............................................. G05B 5/00
[52] U.S. Cl. ................................. 318/312; 318/327; 318/345 D; 318/345 H
[58] Field of Search ............... 318/312, 319, 326, 327, 318/345 C, 345 G, 345 D, 345 H, 514–516, 533, 244, 246, 249, 328, 325, 462; 338/48, 49, 92, 95, 120, 122, 123, 128, 129

[56] References Cited

U.S. PATENT DOCUMENTS

| | | | |
|---|---|---|---|
| 2,425,178 | 8/1947 | Ellerbeck | 171/222 |
| 3,319,591 | 5/1967 | Hamlett | 318/246 X |
| 3,328,662 | 6/1967 | Gambill | 318/313 |
| 3,470,436 | 9/1969 | Steele | 318/227 |
| 3,523,234 | 8/1970 | Turtle | 318/345 D X |
| 3,539,892 | 11/1970 | Lindberg | 318/227 |
| 3,553,556 | 1/1971 | Dosch et al. | 318/327 |
| 3,721,877 | 3/1973 | Werffeli | 318/327 X |
| 3,764,876 | 10/1973 | Arthur | 318/326 |
| 3,809,982 | 5/1974 | Cook | 318/313 |
| 3,857,257 | 12/1974 | Kasmer | 318/257 |
| 3,875,485 | 4/1975 | Hornung | 318/345 D X |
| 3,952,236 | 4/1976 | Hoover | 318/326 X |
| 3,953,776 | 4/1976 | Wolf | 318/312 |
| 4,227,128 | 10/1980 | Cockroft et al. | 318/345 D |
| 4,243,926 | 1/1981 | Phillips | 318/345 D X |
| 4,326,153 | 4/1982 | Contri | 318/345 D X |
| 4,375,609 | 3/1983 | Wolf | 318/312 |

FOREIGN PATENT DOCUMENTS

| | | |
|---|---|---|
| 1298363 | 11/1972 | United Kingdom . |
| 1464792 | 2/1977 | United Kingdom . |
| 2053525A | 2/1981 | United Kingdom . |
| 2023308B | 12/1982 | United Kingdom . |

*Primary Examiner*—Ulysses Weldon
*Attorney, Agent, or Firm*—Neil M. Rose; Robert J. Fox; Clifford A. Dean

[57] ABSTRACT

A motor speed control circuit for closed loop control of an electric motor of a household electric appliance is disclosed herein. The motor speed control circuit includes a coil adapted to be placed in proximity with a fan connected to an electric motor and producing a time varying signal in response to rotation thereof. A comparator connected to the coil generates a rectangular wave having a frequency proportional to the frequency of the coil signal. Additional means are provided for converting the rectangular wave signal, a D.C. signal having an amplitude which corresponds to the frequency of the rectangular wave. The D.C. signal is compared to a reference signal at an amplifier to produce an error signal which is fed through an opto-isolator to a conduction angle controlled thyrister. The thyrister is connected to the electric motor and a source of electric power to control the speed of the electric motor.

3 Claims, 1 Drawing Figure

4,605,883

MOTOR SPEED CONTROL CIRCUIT

BACKGROUND OF THE INVENTION

The present invention relates to motor speed controls suitable for use in controlling and varying the speed of a motor driven kitchen appliance. Although speed control circuits for household kitchen appliances are well known in the art, several of the prior art speed control circuits have suffered from certain disadvantages.

U.S. patent Aaplication No. 916,189 to Ponczek et al., filed June 16, 1978, now abandoned, and assigned to the assignee of the instant application discloses a speed control circuit for use in an electric kitchen appliance, such as a mixer, which employs a mechanical governor as the sensing element and controls a triac, which in turn controls current flow to an appliance motor. It is clear that such a hybrid mechanical-electrical arrangement, while an improvement over previous systems, still leaves much to be desired, in that mechanical components which are subject to wear are employed in the system.

Another speed control system, also assigned to the assignee of the instant application, is disclosed in U.S. Pat. No. 4,227,128 to Cockroft et al. Cockroft et al. is directed to another speed control arrangement wherein the motor speed at which a mechanical governor switches is simultaneously altered as the average conduction angle of a triac is changed by movement of a single control knob. This device also suffers from some of the same disadvantages as the first mentioned mechanical governor/triac hybrid controller.

A relatively complex speed control circuit employing a multiple toothed pulse or interrupter wheel in association with a magnetic pickup as a speed sensing element, which is assigned to the assignee of the present application, is disclosed in U.S. Pat. No. 4,326,153 to Contri. It should be noted, however, that the Contri circuit requires the use of a 24-tooth interrupter wheel which adds additional expense to the appliance.

Accordingly, there is a need for a relatively inexpensive speed control circuit which does not require modification of the mechanical drive components of a home appliance. The electronic control unit should be adapted to be assembled and tested separately from other appliance components, such as the drive motor before the final assembly.

SUMMARY OF THE INVENTION

A feedback motor speed control circuit for controlling the speed of an electric household kitchen appliance is herein disclosed. The feedback motor speed control circuit includes a magnetic coil sensor located in spaced proximity with a fan of an appliance motor for magnetic coupling therewith. The magnetic sensor produces a signal having a frequency substantially proportional to the rotational speed of the electric motor. The signal is clipped and attenuated by conditioning means and fed to a digitizer which produces a uniform amplitude rectangular wave signal having a frequency proportional to the frequency of the magnetic sensing coil signal. The rectangular wave signal is fed to clipping and differentiating means and converted to a pulse signal having a frequency equal to the frequency of the rectangular wave. The pulse signal is fed to integrating means having a relatively long time constant to produce a D.C. speed signal having amplitude proportional to the speed of the electric motor.

Regulated voltage producing means are also provided which supply a regulated voltage to a differential amplifier which also receives the D.C. speed signal. The differential amplifier produces an error signal output which drives an optical coupler to control a high voltage portion of the circuit. The optical coupler controls a charging rate of capacitance means connected to a triac, thereby determining the conduction angle of the triac which is connected to the electric motor for control thereof.

It is a principal object of the present invention to provide a low cost feedback motor control circuit which can be used with a conventional electric motor and fan to control the speed thereof.

It is another object of the instant invention to provide a feedback motor speed control circuit which digitizes a sensed signal prior to analog processing of the sensed signal.

It is still another object of the instant invention to provide a feedback motor speed control circuit which has a first low voltage sensing and conditioning means and a second high voltage motor control means isolated from one another by an optical coupler.

It is still a further object of the instant invention to provide a feedback motor speed control circuit which can be calibrated separately from an electric motor with which it is to be employed.

Other objects and uses of the present invention will become obvious to one skilled in the art by the perusal of the following specification and claims in light of the accompanying drawings.

DESCRIPTION OF THE PREFERRED EMBODIMENT

Figure 1:
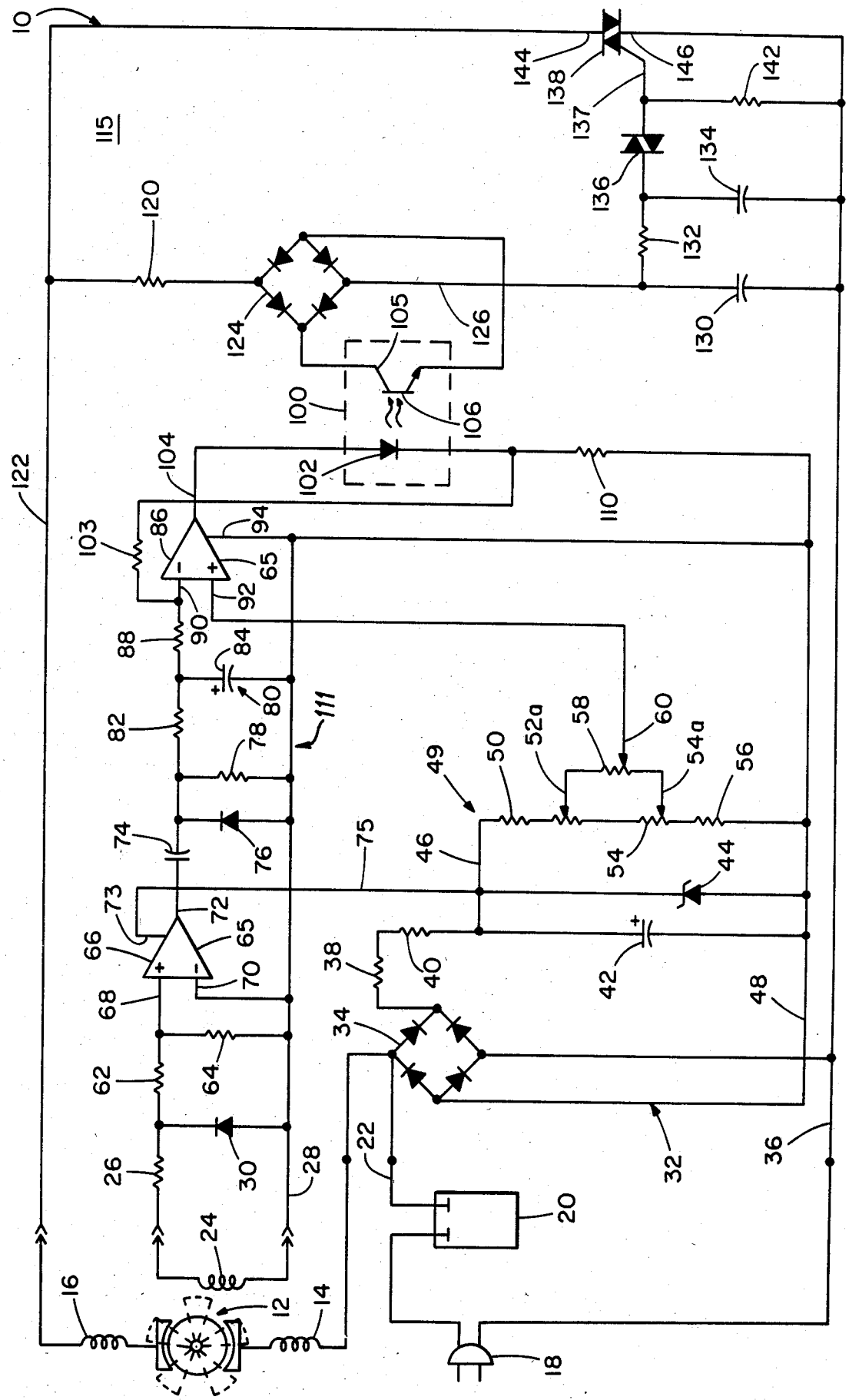
FIG. 1 is a a schematic diagram of a feedback motor speed control circuit embodying the present invention.

Referring now to FIG. 1, the only drawing Figure, a feedback motor speed control generally indicated by numeral 10 and embodying the present invention is shown therein. The feedback speed control circuit 10 is connected to a conventional alternating current or universal motor 12 having an armature 13 and a pair of field coils, respectively identified by numerals 14 and 16. The electric motor 12 provides mechanical energy for an electric household appliance of the type disclosed in U.S. Pat. No. 4,071,789, which is assigned to the assignee of the instant application, and has a cooling fan 11 coupled thereto which rotates at the same speed as the motor 12.

The motor 12 is energized from a suitable source of alternating current received at a plug 18 which is connected to a switch 20. The switch 20 is connected through a lead 22 to the field coil 14 to supply alternating current thereto. The field coil 16 is connected to another portion of the motor speed control circuit 10 for receipt of alternating current at substantially line voltage, as will be described in detail hereinafter.

A pickup or induction coil 24 is mounted to couple magnetically with the fan 11 so that when the motor 12 is operating the fan rotates past the pickup coil 24, thereby periodically varying the reluctance of the pickup coil 24 and causing the pickup coil 24 to generate a time varying coil signal having a frequency proportional to the speed of the rotation of the electric motor 12.

In order to condition the coil signal for processing by other portions of the speed control circuit 10 an attenuating resistor 26 is connected to one of the ends of coil 24 for receipt of the coil signal. A lead 28 is connected to the other end of coil 24. A clipping diode 30, in this case, a 1N4148, is connected at its anode to lead 28 and at its cathode to resistor 26. Diode 30 clips the coil signal to prevent the potential difference between resistor 26 and lead 28 from going above 0.7 volts during the negative half of the output of the pickup coil 24 time-varying coil signal. In the present embodiment, resistor 26 is a 10 kilohm resistor.

In order to provide a suitable supply of electrical energy to other portions of the speed control circuit 10, a power supply circuit 32 is provided therefor and includes a full wave rectifier bridge 34 connected to lead 22 and to a lead 36, which is also connected to plug 18. The rectifier bridge 34 is energized by A.C. line current either at 120 or 240 volts. One of the output terminals of the rectifier bridge 34 is connected to a 6.8 kilohm resistor 38. In a high voltage embodiment of the instant speed control circuit, that is, one which is adapted to be powered from a 240 volt, 50 Hertz alternating current supply, an additional 6.8 kilohm resistor 40 is connected in series with the resistor 38.

When the circuit 10 is used with a 120 volt, 60 Hertz alternating current supply, the resistor 38 is connected directly to a 100 mfd. electrolytic capacitor 42 which filters the ripple out of the rectified supply voltage from the bridge 34. In the 240 volt embodiment the resistor 40 is connected to the electrolytic filter capacitor 42. A reverse-biased Zener diode 44, in this embodiment a 1N4742, having a reverse breakdown voltage of 12 volts, is connected across the electrolytic filter capacitor 42 between a twelve volt D.C. supply lead 46 and a ground D.C. supply lead 48. The twelve volt D.C. supply lead 46 is connected to the junction of the resistor 38 (or resistor 40) and the electrolytic filter capacitor 42. The ground D.C. supply lead 48 is connected to a second output terminal of full wave rectifier bridge 34. Rectifier bridge 34, resistor 38 (or resistors 38 and 40), the electrolytic filter capacitor 42 and the Zener diode 44 function in the well-known fashion to provide a smooth regulated twelve volt D.C. output between the D.C. supply leads 46 and 48. A plurality of resistors 49 is connected in a voltage divider circuit between D.C. supply leads 46 and 48 and includes a resistor 50 having a fixed resistance of 100 kilohms, a potentiometer 52 having a fixed resistance of 10 kilohms, a potentiometer 54 having a fixed resistance of 2.2 kilohms and a resistor 56 having a fixed resistance of 1 kilohm. A tap 52a of potentiometer 52 and a tap 54a of potentiometer 54 have a 100 kilohm potentiometer 58 connected thereacross. A tap 60 of the potentiometer 58 is connected to other portions of the circuit to provide a selectable regulated reference voltage for purposes which will become clear hereinafter.

The output voltage of the pickup coil 24 in the instant embodiment is of the magnitude of 0.5 to 5.0 volts as measured directly across the pickup coil 24. After being clipped, the voltage of the coil signal is further attenuated by a voltage divider comprised of a 10 kilohm resistor 62 connected to the cathode of the diode 30 and a 1 kilohm resistor 64 connected to resistor 62 in parallel with diode 30. The attenuated voltage across the resistor 64 varies between 0.05 volts and 0.15 volts.

In order to convert the attenuated and clipped voltage to a digitized signal, a National Semiconductor LM358N dual operational amplifier 65 is provided. Digitizing of the clipped, attenuated signal is particularly important as it yields a signal having a uniform amplitude and waveform. Without the digitizing the coil signal would vary in both amplitude and frequency as the speed of the motor 12 is changed and thereby introduce error in the speed control function.

One half of the dual operational amplifier 65 is configured as a comparator 66 having a noninverting terminal 68 connected to the junction of the resistor 62 and the resistor 64. An inverting terminal 70 of the comparator 66 is connected to the opposite end of the resistor 64. The comparator 66 also has an output terminal 72 and a positive power supply terminal 73 (identified as pin 8 by National Semiconductor, the manufacturer of the amplifier). The positive power supply terminal 73 is connected by a positive power supply lead 75 to the positive lead 46 to receive regulated 12 volt D.C. current.

The comparator 66 generates a digitized signal, in that a rectangular wave having a frequency substantially proportional to the frequency of the coil signal is provided at the comparator output terminal 72. Since the signal has been digitized and has a uniform amplitude of approximately 12 volts, the comparator 66 minimizes circuit error due to amplitude fluctuations of the coil signal at varying fan speeds.

The digitized signal is fed from the comparator output pin 72 to a 0.015 mfd. differentiating capacitor 74 connected thereto. A 1N4148 diode 76 connected between the capacitor 74 and the lead 28 clips the signal provided by the differentiating capacitor 74. The differentiating capacitor 74 and a 2.2 kilohm resistor 78 connected in parallel with the diode 76 provide a spiking or differential signal the negative portions of which are clipped by the diode 76.

The positive pulse portions of the differential signal have a substantially uniform amplitude and duration and are fed to an integrator 80 comprised of a resistor 82 having a resistance of 22 kilohms and an electrolytic capacitor 84 connected to the resistor 82 and in parallel with the resistor 78 to provide an integrated signal having an amplitude substantially proportional to the frequency of the coil signal, and thus the speed of rotation of the motor 12. The integrated signal is supplied to an operational amplifier 86, comprised of the second half of the LM358N dual operational amplifier 65, through a resistor 88 having a resistance of 100 kilohms which is connected to an inverting terminal 90 of the operational amplifier 86. A noninverting terminal 92 of the operational amplifier 86 is connected to the tap 60 of the potentiometer 58 for receipt of the reference voltage provided by the voltage divider network 49. A negative supply terminal 94 of the operational amplifier 86, identified by National Semiconductor as pin 4, is connected to the lead 28 and the lead 48 and held at circuit ground.

For reasons which will become apparent hereinafter, the output signal from the operational amplifier 86 is converted to a light signal by an optical coupler 100 having a light emitting diode 102 which is connected to an output terminal 104 of the operational amplifier 86. In order to obtain a substantially linear response, in other words, a light flux from the light emitting diode 102 which is substantially proportional to the voltage supplied to terminal 92 minus the voltage on terminal 90, a feedback resistor 103, in this instance having a resistance of 2 megohms, is connected to the cathode of the light emitting diode 102. The light emitting diode 102 is included within the amplifier feedback loop so that the amount of current provided to the diode is proportional to the difference between the input voltages. Thus, when the input voltage proportional to the motor speed is less than the reference voltage from the tap 60, the light emitting diode 102 is illuminated and the amount of light produced by the light emitting diode 102 is substantially proportional to the difference between the reference voltage and the motor speed voltage. In other words, the light flux of the light emitting diode 102 is proportional to the error voltage of the operational amplifier 86. The light emitted by the diode 102 is provided to a phototransistor 105 at its base 106 for control of other portions of the circuit, as will become clear hereinafter. The feedback loop of the operational amplifier 86 has connected thereto a resistor 110 which is also connected to ground lead 48.

Thus, in summary, the portion of the circuit already, described, which might be termed the low voltage portion 111, receives a varying pulse-like ill-conditioned signal from coil 24, clips the signal, attenuates it, digitizes it at the comparator 66, differentiates the signal and selects only the positive spikes representative of the positive going portions of the digitized signal, one of which occurs for each pulse from the pickup coil 24. The differentiated signal has a uniform amplitude so that when the pulses are integrated by the integrator 80, a substantially D.C. signal proportional to the motor speed is provided to the error amplifier 86 which produces an error signal in the form of a light flux. Since the optical coupler 100 couples the low voltage and high voltage sides of the circuit 10, power supply fluctuations and the like are prevented from affecting the sensing and measuring portions of the circuit.

A high voltage portion 115 of the circuit 10 includes a resistor 120, in this embodiment a 10 kilohm resistor, which is connected between a lead 122, which is connected to the field coil 16, and a full wave rectifier bridge 124. The full wave rectifier bridge 124 provides a full wave rectified signal to the phototransistor 105 which controls the amount of alternating current flowing through the bridge and thus through resistor 120 and a lead 126. It is clear, however, that although the phototransistor 105 controls a uni-directional flow of current through itself, the current provided to the lead 126 is alternating current.

In the event that the circuit is to be used with an alternating current power supply of 240 volts, rather than 120 volts, the value of resistor 120 must be changed to 47 kilohms and a resistor 128, also having a value of 47 kilohms must be connected as shown by the dotted lines to the full wave rectifier bridge 124 and to ground lead 36.

The current from the full wave rectifier bridge 124 as controlled by the phototransistor 105 is fed to a first timing capacitor 130, which is connected to the lead 126 and to the ground lead 36. A 10 kilohm resistor 132 is connected to the first timing capacitor 130 and has a second timing capacitor 134 connected thereto in parallel with the first timing capacitor 130. Both first and second timing capacitors 130 and 134 are 0.047 mfd. capacitors. The timing capacitor 134 is charged by current flowing through the lead 126 and when it reaches a preselected level, causes a GT-32 diac 136, which is connected at the junction of the resistor 132 and the capacitor 134, to become conducting. When the diac 136 switches conducting, it supplies a gating signal to a gate terminal 137 of triac 138 to switch the triac 138 into conduction.

A 150 ohm resistor 142 is connected between the triac gate 137 and the ground lead 36 to prevent false triggering of the triac and to limit the current flow to the triac gate. The triac 138 also has a pair of main terminals, respectively numbered 144 and 146, which are respectively connected to the leads 122 and 36. Thus, when the triac 138 is switched on, A.C. power is supplied from plug 18 through field coils 14 and 16 and motor armature 13, thereby energizing the motor. When the motor 12 reaches a preselected speed the light flux from the light emitting diode 102 decreases, thereby modifying the current from the phototransistor 105 and modifying the current flow through the lead 126 to the first timing capacitor 130 and the second timing capacitor 134, thereby controlling the triggering of the diac 136 and controlling the conduction through triac 138.

The speed control circuit 10, however, functions as a proportional controller because the error signal indicative of the difference between the actual motor speed and the preselected speed proportionately controls the amount of current flowing through the phototransistor 105 and thus affects the charging time of the capacitors 130 and 134. Since the triac 138 is configured to function as a conduction angle control the conduction angle of the triac 138 is proportional to the error signal from the operational amplifier 86.

Motor speed control circuit 10 is easy to calibrate and inexpensive to construct. Calibration can be achieved prior to connection of the circuit with an electric motor 12 by supplying a sine wave signal to resistor 26 and lead 28. The sine wave signal has a frequency equal to that generated by the coil 24 at the minimum desired speed of rotation of the electric motor. Wiper 60 of potentiometer 58 is then rotated to its lowest potential and tap 54a of trimpot 54 is adjusted until light emitting diode 102 is extinguished. Similarly, the high speed setting of the motor control circuit 10 is calibrated by supplying to resistor 26 and lead 28 a sine wave having a frequency equal to the coil signal frequency at maximum motor speed. The tap 60 of the potentiometer 58 is rotated to its highest potential position and the tap 52a of the trimpot 52 is adjusted until light emitting diode 102 is barely illuminated. It may be appreciated that at no time in the calibration procedure is it necessary to connect a motor 12 and sensing coil 24 in the circuit. This considerably reduces the cost of manufacture of the unit.

As may be appreciated from the above, it is unnecessary to provide additional mechanical elements as signal producing means when the ill conditioned signal supplied by the ferromagnetic fan blades rotating in proximity with coil 24 is conditioned by digitizing differentiating and integrating the signal in the electronic components of the motor speed control circuit 10. This also produces a considerably cost saving as mechanical variances in the tolerances in the fan blades or their displacement from the magnetic pickup coil 24 are easily compensated for in the electronic circuitry at relatively low cost. Furthermore, it may be appreciated that the sensing and conditioning portion of the circuitry is isolated from the control portion of the circuitry through the use of an optical coupler which prevents damage to the operational amplifiers and associated semiconductors due to switching transients caused by triac 138.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A motor speed control circuit for use in controlling the speed of an electric motor of a household electrical appliance comprising; tachometer means located in proximity with a plurality of blades of a fan in driven connection with an electric motor and producing a tachometer signal when said electric motor rotates said fan blades past said tachometer means, clipping means connected to said tachometer means to produce a clipped tachometer signal having a preselected maximum amplitude, comparator means connected to said clipping means, and producing a rectangular wave signal in response to said clipped tachometer signal received from said clipping means, differentiating means connected to said comparator and receiving said rectangular wave signal therefrom and producing a differentiated pulse signal in response thereto, integrator means connected to said differentiating means and receiving said differentiated pulse signal from said differentiating means and producing a speed signal having an amplitude indicative of a speed of rotation of said electric motor, means for comparing said speed signal to a reference signal and producing an error signal indicative of a difference between said reference signal and said speed signal, isolation means receiving said error signal and producing an isolation error signal in response thereto, timing means receiving said isolation means error signal and producing a signal having a selected amplitude after a period of time proportional to a magnitude of said error signal, and a triac connected to said timing means to receive said selected amplitude signal therefrom and to change state in response thereto to control a flow of electric current received from an external power source through said electric motor of said household electric appliance.

2. A motor speed control circuit as defined in claim 1 further including means for generating said reference signal connected to said means for comparing said speed signal to a reference signal and having a first adjustable resistance adjustable between an upper reference voltage limit and a lower reference voltage limit, a lower reference limit adjustable resistance which provides a preselected low speed voltage and an upper voltage limit adjustable resistance which provides a preselected upper speed voltage, said upper and lower voltage adjustable resistances being connected to said first adjustable resistance to define a voltage range over which said first adjustable resistance operates.

3. A motor speed control circuit for use in controlling the speed of an electric motor of a household electric appliance comprising; a pickup coil located in a spaced proxmiity with a fan of an electric motor to sense a rotational speed of a fan and produce a time-varying first motor speed signal having a frequency proportional to the rotational speed of said fan, attenuation means connected to said pickup coil to reduce a voltage of said first motor speed signal thereby producing a an attenuated first motor speed signal, a first clipping diode connected to said attenuation means and shunting a portion of attenuated first motor speed signal away from other parts of said motor speed control circuit, a comparator connected to said attenuation means to receive said attenuated first motor speed signal to produce a rectangular wave signal having a uniform amplitude and a frequency proportional to the frequency of said attenuated first motor speed signal, means for differentiating said rectangular wave signal producing a differentiated signal having a plurality of pulses, a second diode clipper receiving said differentiated signal and shunting every other pulse of said differentiated signal, means for intergrating a remaining portion of said differentiated signal, means for integrating a remaining portion of said differentiated signal to produce a second motor speed signal having an amplitude proportional to said frequency of said first motor speed signal, reference voltage generating means having a control potentiometer adjustable between an upper reference voltage limit and a lower reference voltage limit, a lower reference voltage limit potentiometer which provides a preselected low speed voltage and an upper reference voltage limit potentiometer which provides a preselected upper speed voltage, said upper and lower reference voltage limit potentiometers being connected to said control potentiometer to define a voltage range over which said control potentiometer operates, an amplifier connected to said control potentiometer to receive a speed reference voltage therefrom and also being connected to said integrating means to receive said second motor speed signal, said amplifier producing an output current having an amplitude proportional to a difference between said speed reference voltage and a voltage of said second motor speed signal, an opto-isolator connected to said amplifier and receiving said output current therefrom to control a flow of electric current received from an external source through a rectifier, timing means including a plurality of resistors and capacitors which receive a charging current from said rectifier, an amplitude of said charging current being controlled by said opto-isolator, and a triac connected to said timing means and to said electric motor to allow said electric current to flow through said electric motor when said capacitors of said timing means have charged to a predetermined level.

* * * * *